(12) United States Patent
Sambles

(10) Patent No.: US 6,600,603 B1
(45) Date of Patent: Jul. 29, 2003

(54) TEXTURED SURFACE

(75) Inventor: John R Sambles, Exeter (GB)

(73) Assignee: Qinetiq Limited, Farnborough (GB)

( * ) Notice: Subject to any disclaimer, the term of this patent is extended or adjusted under 35 U.S.C. 154(b) by 0 days.

(21) Appl. No.: 10/148,275

(22) PCT Filed: Nov. 13, 2000

(86) PCT No.: PCT/GB00/04323

§ 371 (c)(1),
(2), (4) Date: May 29, 2002

(87) PCT Pub. No.: WO01/44839

PCT Pub. Date: Jun. 21, 2001

(30) Foreign Application Priority Data

Dec. 17, 1999 (GB) ............................................. 9929752

(51) Int. Cl.⁷ ................................................. G02B 5/18
(52) U.S. Cl. ...................... 359/576; 359/580; 359/585; 283/91; 283/94
(58) Field of Search ............................... 359/585, 572, 359/576, 580; 283/91, 94, 86

(56) References Cited

U.S. PATENT DOCUMENTS

| 4,568,147 A |   | 2/1986  | Seymour et al.        |
|-------------|---|---------|-----------------------|
| 4,583,818 A | * | 4/1986  | Chen ............. 385/37 |
| 4,765,705 A | * | 8/1988  | Seymour ......... 385/37 |
| 5,116,121 A | * | 5/1992  | Knoll ............ 356/301 |
| 5,598,267 A |   | 1/1997  | Bryan-Brown et al.    |
| 5,846,843 A |   | 12/1998 | Simon                 |
| 5,886,798 A |   | 3/1999  | Staub et al.          |
| 5,969,863 A |   | 10/1999 | Staub et al.          |
| 5,970,190 A |   | 10/1999 | Fu et al.             |
| 6,002,522 A |   | 12/1999 | Hayase et al.         |

FOREIGN PATENT DOCUMENTS

| WO | 95/02200    | 1/1995 |
|----|-------------|--------|
| WO | 99/38039 A  | 7/1999 |

OTHER PUBLICATIONS

R.A. Watts et al., "Optical characterization of a complex grating profile", J. of Modern Optics, 45(3), pp. 639–651(1998).*

F.J.Garcia–Vidal et al., "Localized surface plasmons in lamellar metallic gratings", J. of Lightwave Technology, 17(11), pp. 2191–2195(1999).*

Watts R A et al; "Optical Characterization of a Complex Grating Porfile"; Journal of Modern Optics, GB, London, vol. 45, No. 3, Mar. 1998, pp. 639–651, XP002116468.

* cited by examiner

*Primary Examiner*—John Juba
*Assistant Examiner*—Leo Boutsikaris
(74) *Attorney, Agent, or Firm*—Nixon & Vanderhye P.C.

(57) ABSTRACT

A surface capable of supporting surface charge oscillations and exhibiting a profiled grating, said profile comprising at least two superposed periodic profiles. The surface has applications as radar absorber and authentication devices. Also disclosed is a method of detecting the authenticity of an object comprising providing a surface as described above claim adjacent to or on the object, illuminating said surface with radiation from at least one angle and determining the reflectivity characteristics and comparing this with reflectivity characteristics of a reference surface.

18 Claims, 7 Drawing Sheets

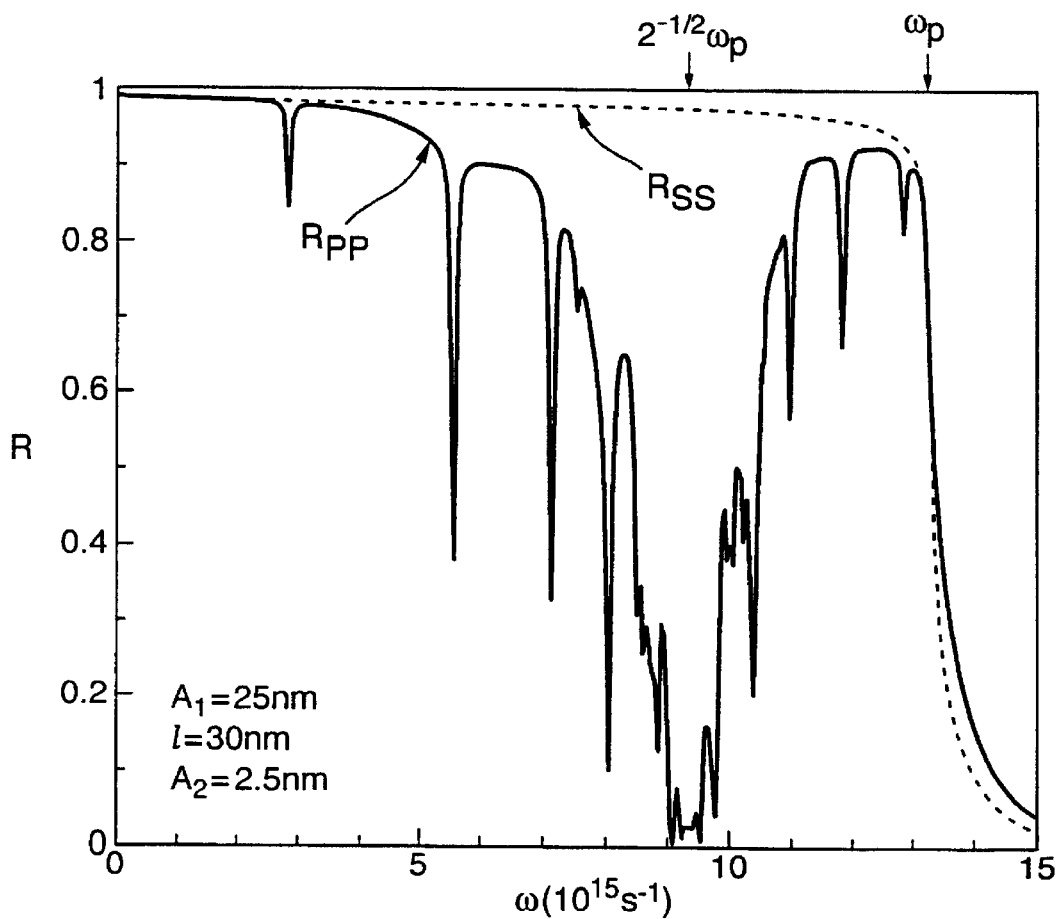

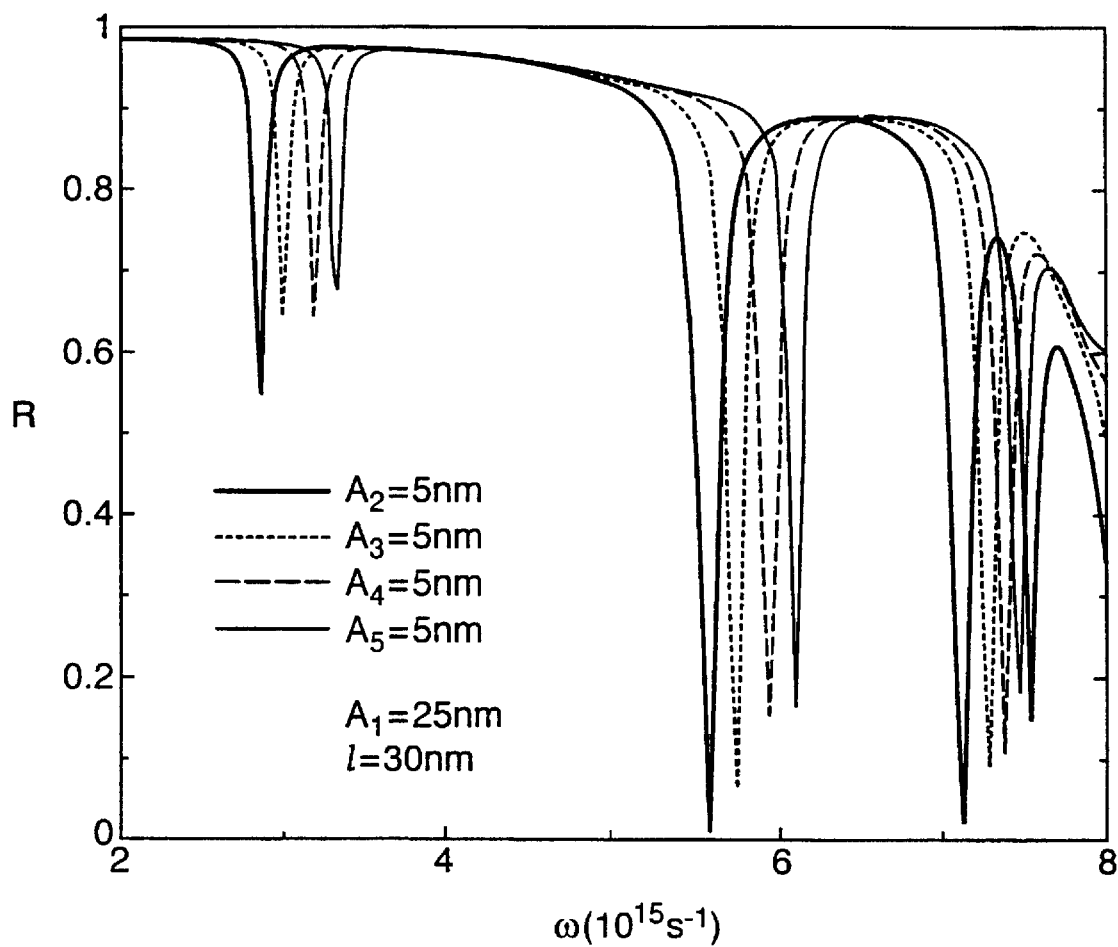

TEXTURED SURFACE

This application is the US national phase of international application PCT/GB00/04323 filed Nov. 13, 2002, which designated the US.

The invention relates to surfaces which are textured (e.g. which exhibit patterns of grooves) and which can be used as absorbers, selective reflectors and radiation detectors. The invention has utility in a wide range of application such as coatings on aircraft to reduce radar signature (i.e. stealth application) solar absorbers, blackened metals for visual camouflage, improved radiation detectors, anti-counterfeiting markings, electromagnetic filters etc. This list is not exhaustive.

More particularly the invention utilises the coupling of photons to modes known as surface plasmon polaritons (SPPs). Surface plasmon polaritons are surface charge density oscillations that are created at the interface between a metallic and a dielectric material. It is a composite of an electromagnetic wave in the dielectric and a plasma wave—a collective electronic excitation—in the metal. Light polarised such that its electric vector crosses such an interface can couple into a SPP and be absorbed but this is not possible under normal conditions: photons made directly incident onto the surface can never possess sufficient momentum to excite the SPP, and a momentum increase from a prism or diffraction grating is required. Under such conditions there are certain frequencies and angles of incidence (corresponding to momentum values) for which SPP's can be observed, these being dictated by the electromagnetic properties of the materials in the vicinity of the interface. Perturbations of these conditions (e.g. deposition of a different dielectric film at the interface) will alter these values, and this phenomenon has formed the basis of several chemical and biological sensors.

U.S. Pat. No. 5,598,267 discloses an optical sensing device that incorporates a surface plasmon polariton apparatus for converting radiation between s and p modes together with a sensor for detecting a maximum in conversion between the s and p modes.

As stated above, on a flat metal surface, an SPP mode cannot be directly coupled to by incident radiation because the photons do not exhibit high enough momentum values. This can be illustrated on a plot of in-plane momentum versus photon frequency (i.e. the dispersion curve of the SPP—FIG. 1): the SPP mode momentum is represented by a curve that lies outside the light cone (the momentum values obtainable from the incident photons). The momentum of a photon $k(\omega)$ is linearly proportional to its frequency $\omega$—hence the light cone—but the x-axis represents the component of momentum parallel to the surface. (The light cone represents the momentum values attainable by photons in vacuo). Hence for a given frequency $\omega_1$, the photon momentum along the surface can vary from zero (normal incidence) to $k(\omega_1)$ (grazing incidence), and the x-axis is therefore proportional to the incident angle.

When a profiled grating is created on the metal surface, two closely related physical effects occur. First the periodicity of the grating provides additional in-plane momentum for the incident photons, effectively shifting the SPP curve into the light cone, which enables the excitation of the SPP by electromagnetic radiation. Secondly, the SPP dispersion curve is often split into bands, just as the electronic states in a periodic potential form into bands. These two effects enable workers to design the optical properties of metal surfaces via choosing suitable grating profiles.

Gratings that exhibit pitches (i.e. groove widths in a periodic structure) that are far less than the wavelength of the incident radiation cannot diffract the radiation, and the radiation is specularly reflected (i.e. it is reflected in a mirror-like fashion). Such gratings are sometimes defined to exhibit zero-order diffraction, since no additional beams or orders are created. It has recently been stated in the literature that very flat (i.e. parallel to the x-axis in the dispersion plot) SPP bands may be formed on deep short pitch metal gratings of this type, each of which corresponds to a standing SPP mode localized in the grating grooves. However, within the light cone the SPP modes on such a sinusoidal grating are very broad (short ranged) because they are strongly radiative. Consequentially the excitation of the SPP modes only leads to weak absorption of the incident light over a wide range of the frequency band. In other words a single-period zero-order sinusoidal grating does not drastically change the optical properties of the metal surface except for the case of large incident angle where sharp resonant absorption may occur.

However the inventors have determined that if two gratings are superimposed on a surface—one of short pitch (a zero-order (non-diffractive) grating) and one being of longer period (possibly diffractive)—then the band structure can be controlled in a unique fashion. The inventors have thus determined that by using a grating having two or more periodic profiles it is possible to enhance the SPP effects to limit reflection further, producing absorption over wide ranges of angle of incidence and/or frequency. See "Optical characterization of a complex grating profile", R. A. Watts et al., Journal of modern optics, vol 45, no 3, March 1998, pages 639–651 where an example of a complex grating is studied.

The invention comprises a surface capable of supporting surface charge oscillations and exhibiting a profiled grating, said profile comprising at least two superposed periodic profiles. Preferably, the at least two superimposed periodic profiles have different periodicity. In order to produce a surface plasmon it is necessary that the surface (i.e. substrate) has free electrons and thus the surface is necessarily metallic or a semiconductor. It may be coated in a layer of dielectric material.

The use of two superimposed periodic profiles creates a textured surface.

Preferably, the profiled grating comprises two superposed periodic profiles, a first periodic profile having a shorter periodic profile and a second period having a longer periodic profile. Preferably, the amplitude of said shorter periodic profile is greater than the amplitude of the larger periodic profile. Advantageously the period of the smaller grating period is non-diffractive, and less than twice the wavelength of incident radiation, preferably less than a third of the wavelength of incident radiation.

The first grating's features should be too finely spaced to create diffracted orders, exhibiting a pitch that is less than the wavelength of the incident radiation i.e. it should be a zero-order grating. The splitting of the SPP bands will be dictated by the depth of the grooves of this short-period grating, and the preferred sample geometry will exhibit deeper short-pitch grooves than the second long-pitch grating. When the bands are split they become 'flat' (i.e. tend towards being parallel to the momentum axis of the dispersion graph) and hence can be accessed over a wide range of angles of incidence for a given frequency.

The second grating is of a longer pitch, and may or may not be fully diffractive. The purpose of this second grating is to provide efficient overlap of the split SPP bands with the light-cone, and if this can be achieved without recourse to a fully diffractive structure then no radiation will be lost (i.e. transmitted away from the surface) in diffracted beams.

By choosing the correct pitches, groove depths, profile shapes and material constants it is possible to modify the usual "narrow angle" absorption of an SPP excited on a single-period diffractive surface into a wide angle feature that occurs at several different frequencies. Furthermore if the different frequencies are sufficiently close to each other in value then the absorption features will overlap creating a wide frequency absorption too.

Thus such surfaces can provide for very wide spectral absorbers over a wide range of incident angle ranges, as well as efficient narrow band absorbers of tailored properties.

The effect of textured surfaces is also dependent on the angle of polarisation of the incident light. Only radiation which is electrically polarised in a plane perpendicular (orthogonal) to the surface will have the desired effect and thus the invention provides for allowing radiation polarised in a particular direction to be reflected whilst damping radiation polarised in a different direction.

In a more complex embodiment of the invention the grating essential provides for the double frequency grating in two dimensions. For example the double frequency profile is fabricated in two azimuthal directions across the surface e.g. one perpendicular to the other. This will reduce the polarisation dependence of absorption.

The invention will be described with reference to examples and to the following figure of which:

FIG. 5 shows reflection coefficients near the second SPP resonance for TM polarised normal incident radiation from a series of double-period gratings.

FIG. 2 shows a schematic FIG. 1 of a surface having a profile comprising superimposed periodic waveforms. This shows a sinusoidal wave form 2 superposed on a larger period sinusoidal profile 3.

Figure 1:
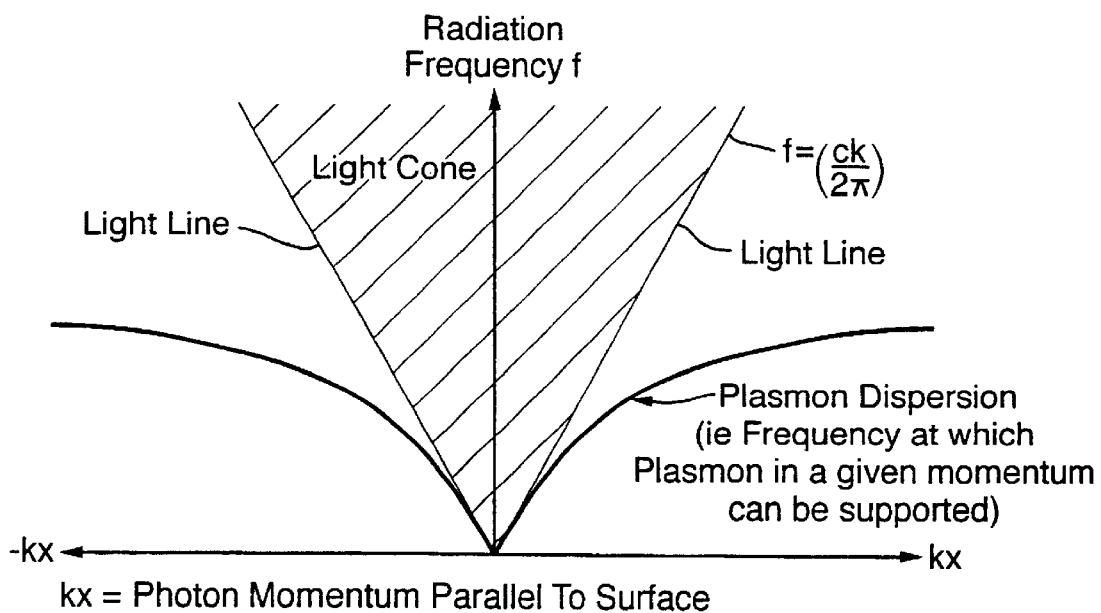
FIG. 1 represents the dispersion plot for SPP modes at a planar metal-dielectric interface, illustrating the light-cone.
Figure 2:
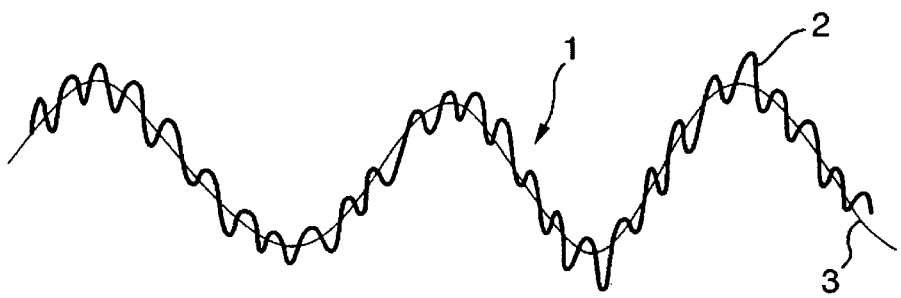
FIG. 2 shows a schematic figure of a surface having a profile comprising superimposed periodic wavefonn.
Figure 3A:
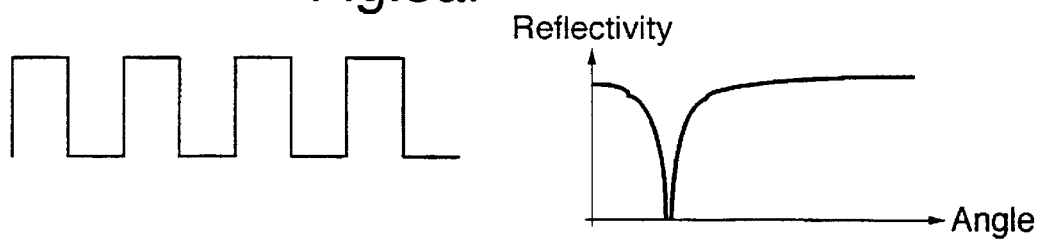
FIG. 3 shows a schematic representation of a simple rectangular grating and its reflectivity response in comparison with a double superimposed rectangular waveform grating
Figure 3B:
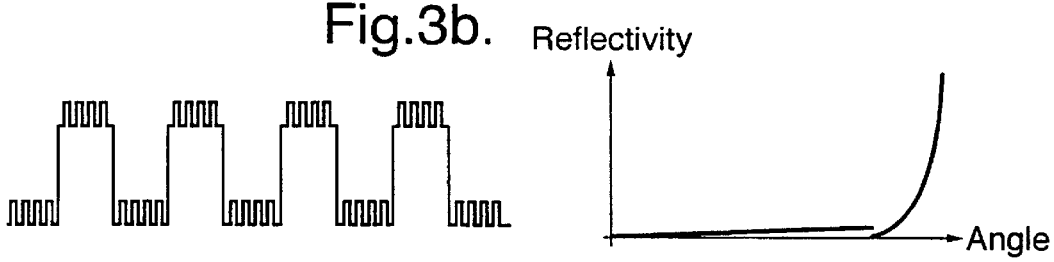
Figure 4A:
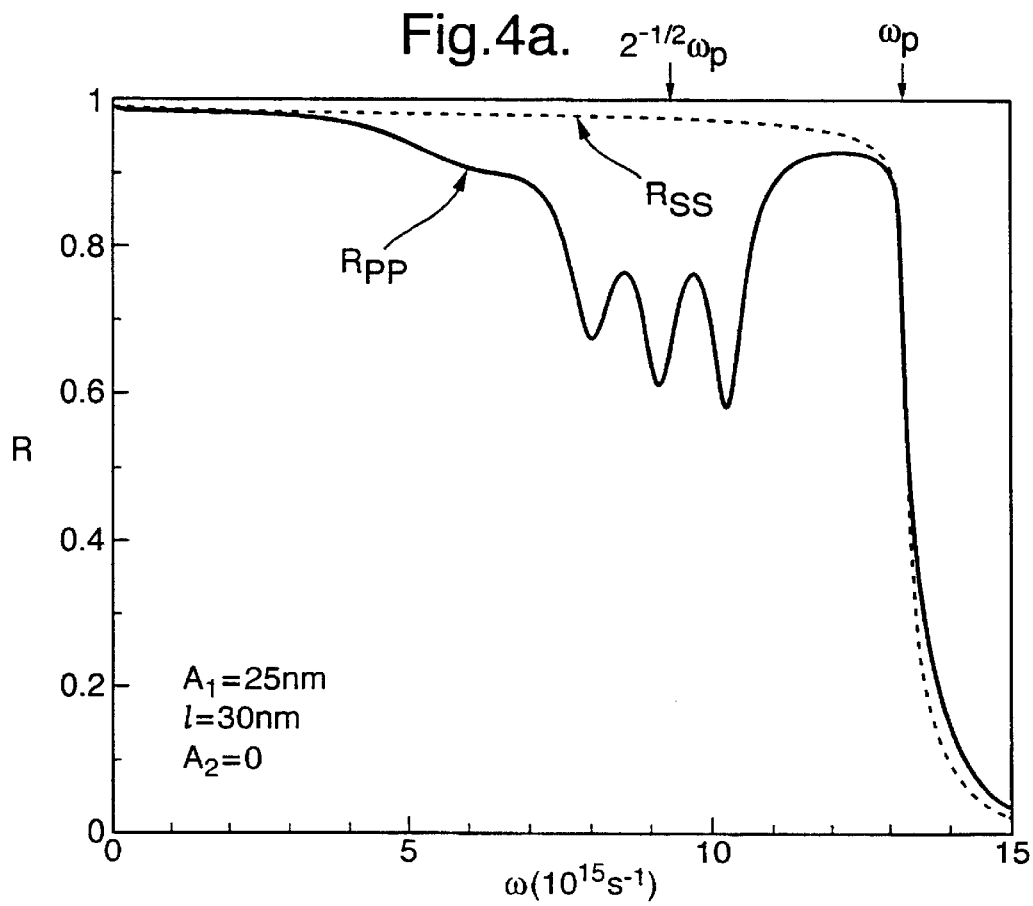
FIG. 4 shows reflection coefficients against frequency for normal incident optical waves for a single period and a number of double period gratings.
Figure 4B:
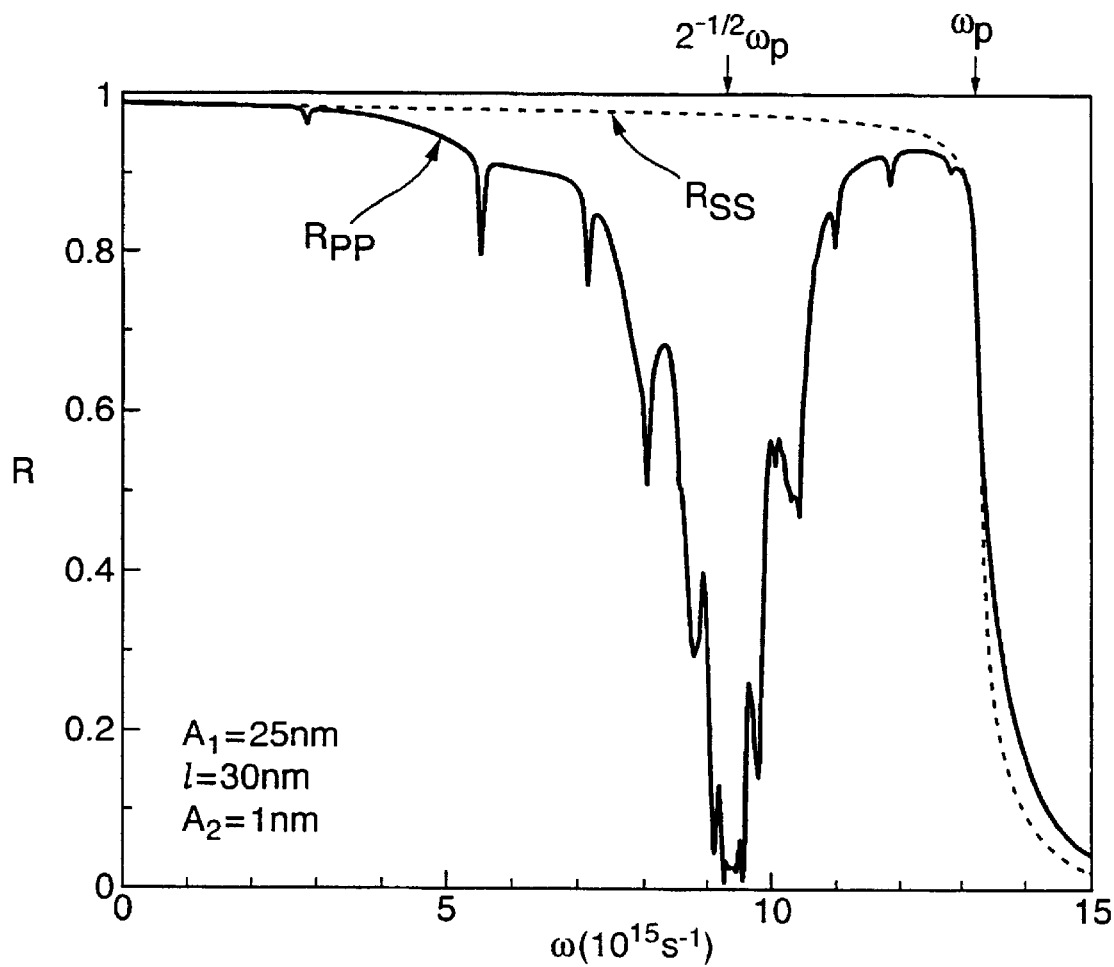
Figure 4D:
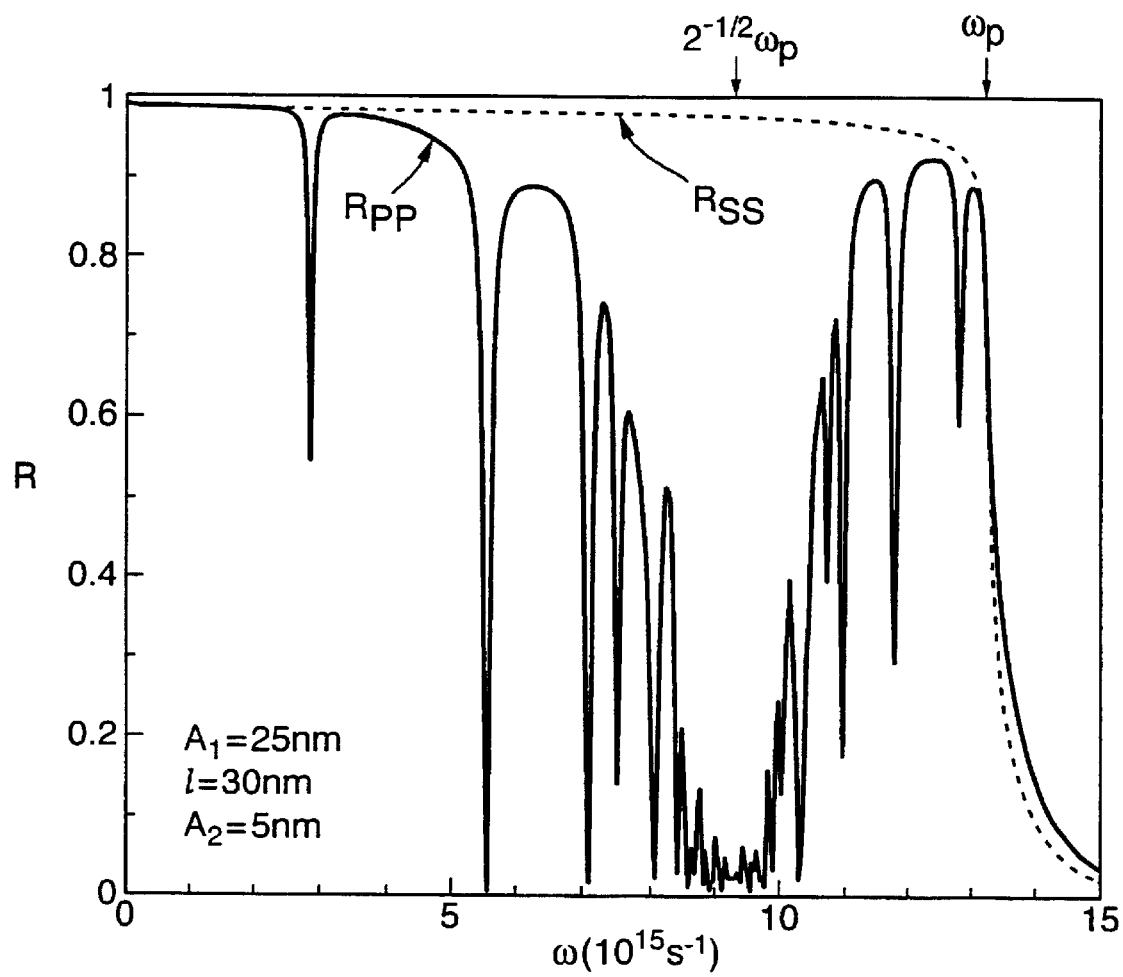

FIGS. 4a to d show the reflection coefficients for both TM and TE polarised normal incident radiation calculated for four different silver gratings. In each case the surface profile can be described by the equation $Z = A_1 \sin(2\pi/1) + A_2 \sin(2\pi/21 + \alpha_2)$ Where Z is the vertical displacement of the profile, 1 (the period of the non-diffractive grating) is 30 nm, $A_1$, the amplitude of the non-diffractive grating's grooves) is 25 nm, $\alpha_2=0$ and the amplitude $A_2$ of the 60 nm period grating is zero, 0.1 nm, 2.5 nm and 5 nm for the four gratings respectively. FIG. 1a is therefore a single period grating and the remainder are double period gratings.

FIGS. 4(a to d) shows tile reflection coefficient curves for TE polarised incident waves, for which the electric field of the incident radiation lies parallel to the substrate horizon. Since no component of the electric field crosses the interface between metal and dielectric, SPPs cannot be excited, and therefore there is no strong-absorption mechanism. For ω, <ωp, (where ωp is the plasma frequency of the metal) the silver is a good reflector and TE polarised incident wave is nearly totally reflected. As the gratings are zero order, no diffraction occurs and as a result the zero order reflection coefficients of a zero-order metal grating is not sensitive to the grating profile. For ω>ωp, both the TE and tile TM polarised incident waves can excite bulk plasmons in the metal, resulting strong absorption, and the reflection coefficients become very small.

In contrast to a TE polarised wave, a TM polarised incident wave can excite the SPPs on a grating surface, and therefore its reflection coefficient is very sensitive to the grating profile. FIG. 1a shows that, for the case $A_2=0$, which represents a pure zero-order sinusoidal grating tile reflectivity only varies from unity at a few discrete and inefficient absorptions in the region ω<ωp. However, when a weak but finite long-period (60 nm) component is introduced into the grating (FIG. 9b), very narrow but deep reflection minima appear in the frequency regions where the light is nearly total reflected by the original single-period grating. Since the gratings are zero-order in the whole frequency region considered here, all reflected radiation is contained within this specular beam. Therefore any deviation from total reflection is due to absorption. Although the amplitudes of the long-period component are small compared to that of the principal component, their effect on the optical response of the silver grating are dramatic. Generally one can see that the effect of having at least two periods in the grating substantially reduces reflection of incident radiation.

FIG. 5 shows the reflection coefficients for TM polarised radiation made normally incident upon a silver grating for which 1=30 nm and $A_1=25$ nm (fixed), but for which the values of A2 (the long-period amplitude) are varied. It can be seen that when $A_2=1$ nm, the reflection minimum is very narrow and shallow, which indicates that the SPP mode is significantly under-coupled to the incident radiation. As $A_2$ increases, the reflection minimum becomes deeper and wider until at $A_2=5$ nm, maximum absorption occurs (the reflectivity R=0) As $A_2$ increases further, the resonance conditions degrade and therefore the absorption minimum becomes wider and shallower. As $A_2$ increases the reflection minimum shifts slightly up in frequency reflecting the perturbation of the SPP mode by the long pitch component of the grating. This shows the decree of control that is available by altering the grating dimensions.

Generally therefore, having a grating with at least two superposed profiles of differing wavelengths allows some interesting effects in terms of transmission, absorption as well as the selective transmission or absorption of radiation dependant on the wavelength polarisation and angle of incidence of the incident radiation. Choice of appropriate period for the shorter and longer period profiles would depend on the particular effect required which can easily be theoretically determined. In general however, the amplitude of said shorter periodic profile is greater than the amplitude of the larger periodic profile. The period of the smaller grating period should be non-diffractive, i.e. the period of the smaller period is less than twice the wavelength of incident radiation, preferably less than a third of the wavelength of incident radiation.

Figure 6:
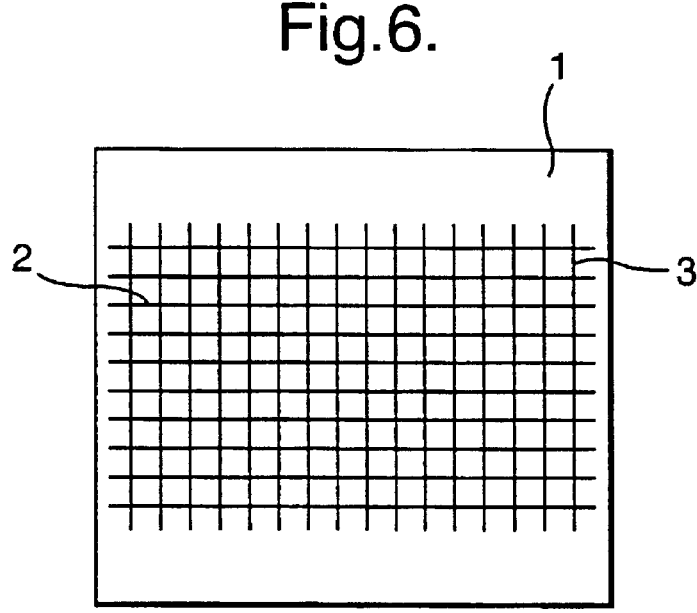
FIG. 6 shows an embodiment according to the invention comprising a double frequency grating in two dimensions.
Figure 7:
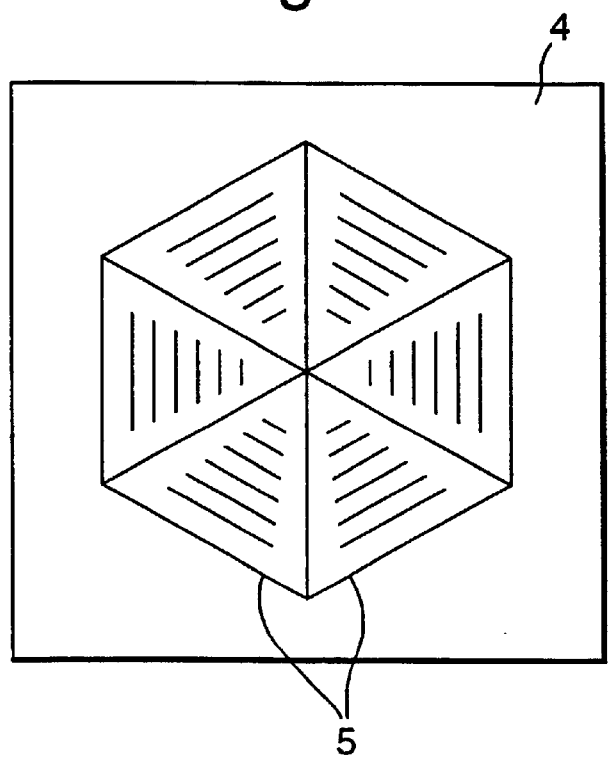
FIG. 7 shows an embodiment according to the invention comprising a series of patches wherein each patch provides a double frequency grating in a different azimuthal direction.

In a further embodiment of the invention, two or more double frequency (i.e.) superposed gratings may be provided for on the same surface, which themselves are superposed (i.e. overlapping) but which are non parallel i.e. at azimuthal angles with respect to each other. In other words the double frequency grating is provided for in two dimensions. FIG. 6 shows a schematic view of a "bigrating" 1 wherein two double frequency gratings 2, 3 are provided for which are overlapping (i.e. superposed) orthogonally with respect to another. In a related embodiment according to the invention, the multiple double frequency gratings are provided for on the same surface but non-overlapping, i.e. in patches. FIG. 7 shows a surface 4 of having series of six patches 5 wherein each patch comprising a double period grating but which is at a different angle to that in adjacent patches. Depending on the angle of incident radiation, each patch will have different reflectivity characteristics. Such a surface of multiple double period gratings (either overlapping or in patches) has application in anti-counterfeiting applications.

What is claimed is:

1. A surface capable of supporting surface charge oscillations and exhibiting a profiled grating, said profile comprising at least two superposed periodic profiles.

2. A surface as claimed in claim 1 wherein the at least two superimposed periodic profiles have different periodicity.

3. A surface as claimed in claim 1 or claim 2 wherein said surface is a metal.

4. A substrate as claimed in claim 1 wherein the grating profiles are sinusoidal, triangular or rectangular.

5. A substrate as claimed in claim 1 wherein the amplitude of the grating having the shorter periodic profile is greater than the amplitude of the other grating.

6. A substrate as claimed in claim 1 wherein the pitch of the first grating is adapted to be less than a third of the wavelength of incident radiation.

7. A surface as claimed in claim 6 wherein the amplitude of said shorter periodic profile is treater than the amplitude of the larger periodic profile.

8. A substrate as claimed in claim 1 additionally comprising at least one further grating profile, the profile comprising at least two superposed periodic profiles superimposed on the substrate and orientated at a different azimuthal angle thereto.

9. A radiation absorber comprising a substrate as claimed in claim 1.

10. An aircraft, vehicle, boat or building incorporating on at least part of its exterior, a substrate as claimed in claim 1.

11. An anti-counterfeit device comprising a substrate as claimed in claim 1.

12. A camouflage material comprising a substrate claimed in claim 1.

13. A radiation detector including a substrate as claimed in claim 1.

14. A method of detecting the authenticity of an object comprising providing a substrate as claimed in claim 1 on the object, illuminating the surface of said substrate with radiation from at least one angle and determining the reflectivity characteristics of the surface and comparing this with reflectivity characteristics of a reference surface.

15. An anti-counterfeit device comprising a surface as claimed in claim 1.

16. A camouflage material comprising a surface as claimed in claim 1.

17. A radiation detector including a surface as claimed in claim 1.

18. A method of detecting the authenticity of an object comprising providing a surface as claimed in any preceding claim adjacent to or on the object, illuminating said surface with radiation from at least one angle and determining the reflectivity characteristics and comparing this with reflectivity characteristics of a reference surface.

* * * * *